United States Patent
Liszt et al.

(10) Patent No.: US 9,894,740 B1
(45) Date of Patent: Feb. 13, 2018

(54) INTELLIGENT LIGHTING MODULE FOR A LIGHTING FIXTURE

(71) Applicant: Cree, Inc., Durham, NC (US)

(72) Inventors: Kory Liszt, Apex, NC (US); Donald Walker, Union Grove, WI (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/621,695

(22) Filed: Jun. 13, 2017

(51) Int. Cl.
| | |
|---|---|
| H05B 37/02 | (2006.01) |
| H05B 33/08 | (2006.01) |
| F21S 8/02 | (2006.01) |
| F21Y 115/10 | (2016.01) |
| F21K 9/62 | (2016.01) |
| F21V 3/02 | (2006.01) |

(52) U.S. Cl.
CPC ..... *H05B 37/0272* (2013.01); *H05B 33/0809* (2013.01); *H05B 33/0827* (2013.01); *H05B 33/0854* (2013.01); *F21K 9/62* (2016.08); *F21S 8/026* (2013.01); *F21V 3/02* (2013.01); *F21Y 2115/10* (2016.08)

(58) Field of Classification Search
CPC ............... H05B 33/08; H05B 33/0845; H05B 33/0809; H05B 33/0827; H05B 33/0854; H05B 37/02; H05B 37/0227; H05B 37/0272; H05B 37/0218; H05B 37/0245
See application file for complete search history.

(56) References Cited

U.S. PATENT DOCUMENTS

| | | |
|---|---|---|
| 4,679,086 A | 7/1987 | May |
| 9,155,165 B2 | 10/2015 | Chobot |
| 9,456,482 B1 | 9/2016 | Pope et al. |

(Continued)

FOREIGN PATENT DOCUMENTS

| | | |
|---|---|---|
| EP | 2709428 A2 | 3/2014 |
| JP | 2010141663 | 6/2010 |

(Continued)

OTHER PUBLICATIONS

Abdi, Hervé, "MetricMultidimensional Scaling (MDS): Analyzing DistanceMatrices," Encyclopedia of Measurement and Statistics, 2007, Thousand Oaks, California, SAGE Publications, Inc., 13 pages.

(Continued)

*Primary Examiner* — Thai Pham
(74) *Attorney, Agent, or Firm* — Withrow & Terranova, P.L.L.C.

(57) ABSTRACT

A lighting fixture includes an LED light source that outputs light for general illumination in response to a drive signal, and a driver module configured to provide the drive signal in response to an intelligent lighting module (ILM) instruction. An ILM that is separate from the driver module is provided and has a first plurality of sensors, a first communication interface, a second communication interface, and first control circuitry. The control circuitry of the ILM is configured to communicate with at least one remote entity via the first communication interface as well as generate the ILM instruction for the driver module based on sensor data gathered from the first plurality of sensors, remote entities, or a combination thereof. The ILM instruction is provided to the driver module via the second communication interface and used by the driver module to control the drive signal for the LED array.

24 Claims, 14 Drawing Sheets

(56) References Cited

U.S. PATENT DOCUMENTS

| | | |
|---|---|---|
| 9,730,289 B1 | 8/2017 | Hu et al. |
| 2006/0071780 A1 | 4/2006 | McFarland |
| 2007/0061050 A1 | 3/2007 | Hoffknecht |
| 2008/0125161 A1 | 5/2008 | Ergen et al. |
| 2009/0045971 A1 | 2/2009 | Simons et al. |
| 2011/0007168 A1 | 1/2011 | Nagara et al. |
| 2011/0031897 A1 | 2/2011 | Henig et al. |
| 2012/0038281 A1 | 2/2012 | Verfuerth |
| 2012/0146518 A1 | 6/2012 | Keating et al. |
| 2013/0182906 A1 | 7/2013 | Kojo et al. |
| 2013/0293877 A1 | 11/2013 | Ramer et al. |
| 2014/0028200 A1 | 1/2014 | Van Wagoner et al. |
| 2014/0062312 A1 | 3/2014 | Reed |
| 2014/0159577 A1 | 6/2014 | Manoukis et al. |
| 2014/0211985 A1 | 7/2014 | Polese et al. |
| 2014/0217261 A1 | 8/2014 | De Groot et al. |
| 2014/0266916 A1 | 9/2014 | Pakzad et al. |
| 2014/0266946 A1 | 9/2014 | Bily et al. |
| 2015/0097975 A1 | 4/2015 | Nash et al. |
| 2015/0208490 A1 | 7/2015 | Bishop et al. |
| 2015/0245451 A1 | 8/2015 | Sung et al. |
| 2015/0264784 A1 | 9/2015 | Romano |
| 2015/0309174 A1 | 10/2015 | Giger |
| 2015/0370848 A1 | 12/2015 | Yach et al. |
| 2016/0095189 A1 | 3/2016 | Vangeel et al. |
| 2016/0112870 A1 | 4/2016 | Pathuri |
| 2016/0124081 A1 | 5/2016 | Charlot et al. |
| 2016/0192458 A1 | 6/2016 | Keith |
| 2016/0270179 A1 | 9/2016 | Ryhorchuk et al. |
| 2016/0282126 A1 | 9/2016 | Walls et al. |
| 2016/0286619 A1 | 9/2016 | Roberts et al. |
| 2017/0228874 A1 | 8/2017 | Roberts |
| 2017/0230364 A1 | 8/2017 | Barile et al. |
| 2017/0231060 A1 | 8/2017 | Roberts et al. |
| 2017/0231061 A1 | 8/2017 | Deese et al. |
| 2017/0231066 A1 | 8/2017 | Roberts et al. |

FOREIGN PATENT DOCUMENTS

| | | |
|---|---|---|
| WO | 2010004514 A1 | 1/2010 |
| WO | 2012143814 A1 | 10/2012 |
| WO | 2013121342 | 8/2013 |
| WO | 2013158955 A1 | 10/2013 |
| WO | 2014147524 A1 | 9/2014 |
| WO | 2015103482 A1 | 7/2015 |

OTHER PUBLICATIONS

Author Unknown, "Procrustes analysis," https://en.wikipedia.org/wiki/Procrustes_analysis, Jul. 16, 2016, Wikipedia, 5 pages.

Author Unknown, "Thread Commissioning," Revision 2.0, Jul. 13, 2015, Thread Group, Inc., www.threadgroup.org, 26 pages.

Author Unknown, "Thread Stack Fundamentals," Revision 2.0, Jul. 13, 2015, Thread Group, Inc., www.threadgroup.org, 21 pages.

Boots, Byron, et al., "A Spectral Learning Approach to Range-Only SLAM," Proceedings of the 30th International Conference on Machine Learning, vol. 28, 2013, Atlanta, Georgia, JMLR Workshop and Conference Proceedings, 8 pages.

Kobourov, Stephen, G., "Force-Directed Drawing Algorithms," Handbook of Graph Drawing and Visualization, Chapter 12, 2013, CRC Press, pp. 383-408.

Non-Final Office Action for U.S. Appl. No. 15/192,308, dated Jul. 3, 2017, 11 pages.

Non-Final Office Action for U.S. Appl. No. 15/192,479, dated Jan. 6, 2017, 17 pages.

Non-Final Office Action for U.S. Appl. No. 15/192,035, dated May 31, 2017, 19 pages.

Non-Final Office Action for U.S. Appl. No. 15/191,846, dated Mar. 22, 2017, 12 pages.

Notice of Allowance for U.S. Appl. No. 15/191,846, dated Jul. 13, 2017, 8 pages.

International Search Report and Written Opinion for International Patent Application No. PCT/US2017/016448, dated Apr. 6, 2017, 16 pages.

International Search Report and Written Opinion for International Patent Application No. PCT/US2017/016454, dated Apr. 6, 2017, 16 pages.

International Search Report and Written Opinion for International Patent Application No. PCT/US2017/016469, dated Apr. 6, 2017, 16 pages.

Final Office Action for U.S. Appl. No. 15/192,308, dated Oct. 20, 2017, 12 pages.

Final Office Action for U.S. Appl. No. 15/192,035, dated Sep. 14, 2017, 15 pages.

Non-Final Office Action for U.S. Appl. No. 151192,479, dated Dec. 15, 2017, 11 pages.

Advisory Action for U.S. Appl. No. 15/192,035, dated Dec. 1, 2017, 3 pages.

INTELLIGENT LIGHTING MODULE FOR A LIGHTING FIXTURE

FIELD OF THE DISCLOSURE

The present disclosure relates to lighting fixtures, and in particular to an intelligent lighting module for lighting fixtures.

BACKGROUND

In recent years, a movement has gained traction to replace incandescent light bulbs with lighting fixtures that employ more efficient lighting technologies as well as to replace relatively efficient fluorescent lighting fixtures with lighting technologies that produce a more pleasing, natural light. One such technology that shows tremendous promise employs light emitting diodes (LEDs). Compared with incandescent bulbs, LED-based lighting fixtures are much more efficient at converting electrical energy into light, are longer lasting, and are also capable of producing light that is very natural. Compared with fluorescent lighting, LED-based fixtures are not only more efficient, but are also capable of producing light that is much more natural and more capable of accurately rendering colors. As a result, lighting fixtures that employ LED technologies are replacing incandescent and fluorescent bulbs in residential, commercial, and industrial applications.

Unlike incandescent bulbs that operate by subjecting a filament to a desired current, LED-based lighting fixtures require electronics to drive one or more LEDs. The electronics generally include a power supply and special control circuitry to provide uniquely configured drive signals that are required to drive the one or more LEDs in a desired fashion. The presence of the control circuitry adds a potentially significant level of intelligence to the lighting fixtures that can be leveraged to employ various types of lighting control. Such lighting control may be based on various environmental conditions, such as ambient light and occupancy.

Unfortunately, the added complexity of the electronics in an LED-based lighting fixture tends to increase the cost of the LED-based lighting fixtures as well as the failure rate. While the LEDs have proven to be extremely reliable, the electronics tend to be the limiting reliability factor of the LED-based lighting fixtures. Repairing or replacing LED-based lighting fixtures is generally tedious and expensive. As such, there is not only a need to increase the reliability of LED-based lighting fixtures, but there is also a need for a design that makes the repair of failed LED-based lighting fixtures much easier and economical.

SUMMARY

A lighting fixture includes an LED light source that outputs light for general illumination in response to a drive signal, and a driver module configured to provide the drive signal in response to an intelligent lighting module (ILM) instruction. An ILM that is separate from the driver module is provided and has a first plurality of sensors, a first communication interface, a second communication interface, and control circuitry. The control circuitry of the ILM is configured to communicate with at least one remote entity via the first communication interface as well as generate the ILM instruction for the driver module based on sensor data gathered from the first plurality of sensors, remote entities, or a combination thereof. The ILM instruction is provided to the driver module via the second communication interface and used by the driver module to control the drive signal for the LED array. As such, the light for general illumination is controlled by the ILM, and communications between the lighting fixture and the at least one remote entity are facilitated by the first ILM.

In essence, the intelligence as well as the sensing and external communication functions of the lighting fixture are provided by the ILM. The driver module simply drives the LED array based on instructions provided by the ILM. In one embodiment, the lighting fixture and the ILM are configured such that one ILM is easily replaced with another ILM in case an ILM fails or the sensing or communication capability of the lighting fixture needs to be changed. Notably, replacing the ILM will not affect the driver module, which may remain with the lighting fixture and is often specially tuned or mated with the LED array of the lighting fixture.

For example, if a sensor or the control circuitry of one ILM fails, the faulty ILM is easily replaced with a new ILM equipped with the same type of sensors and communication capabilities as the faulty ILM. Alternatively, an original ILM that only has an ambient light sensor and an occupancy sensor is easily replaced with a new ILM that has light, occupancy, and chemical sensors; image and vibration sensors; or the like. The types of sensors and possible sensor combinations for the ILM are virtually limitless.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

Figure 1:
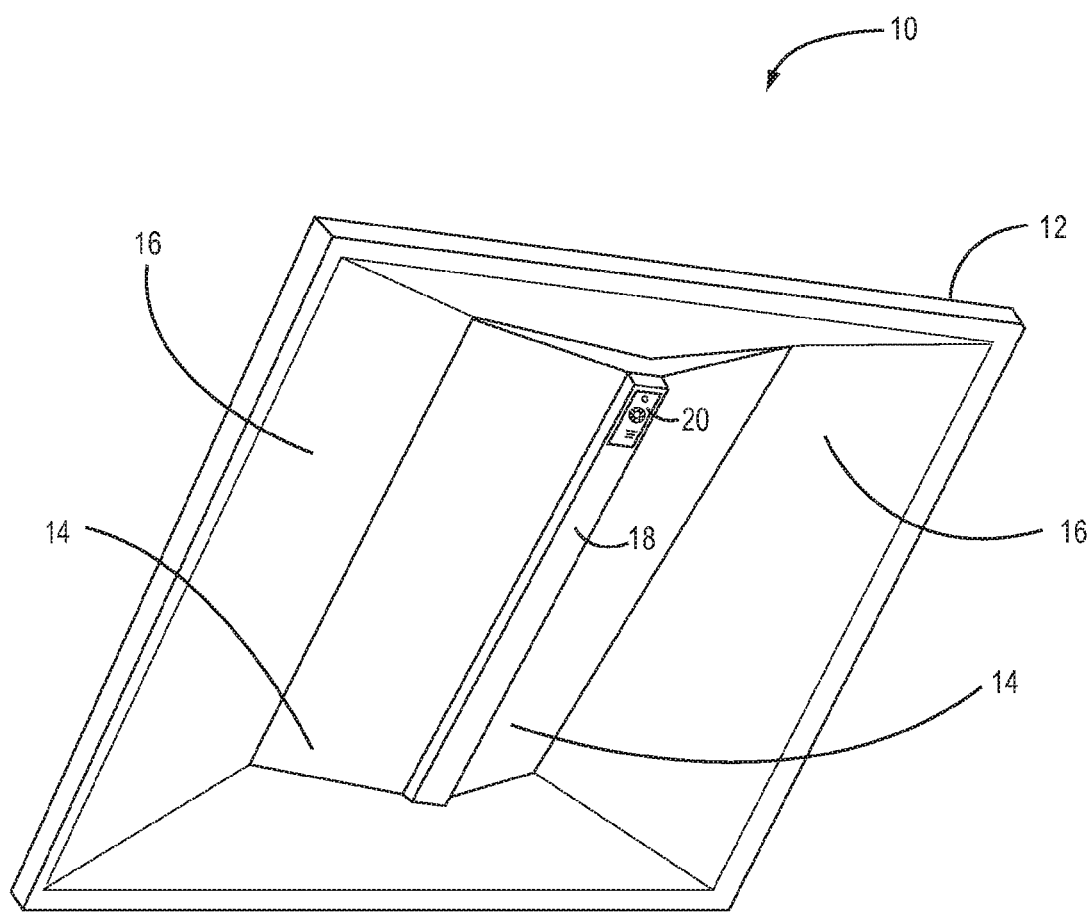
FIG. 1 is a perspective view of a troffer-based lighting fixture according to one embodiment of the disclosure.

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that relative terms such as "front," "forward," "rear," "below," "above," "upper," "lower," "horizontal," or "vertical" may be used herein to describe a relationship of one element, layer or region to another element, layer or region as illustrated in the figures. It will be understood that these terms are intended to encompass different orientations of the device in addition to the orientation depicted in the figures.

For the present disclosure, a lighting fixture includes an LED light source that outputs light for general illumination in response to a drive signal, and a driver module configured to provide the drive signal in response to an intelligent lighting module (ILM) instruction. An ILM that is separate from the driver module is provided and has a first plurality of sensors, a first communication interface, a second communication interface, and control circuitry. The control circuitry of the ILM is configured to communicate with at least one remote entity via the first communication interface as well as generate the ILM instruction for the driver module based on sensor data gathered from the first plurality of sensors, remote entities, or a combination thereof. The ILM instruction is provided to the driver module via the second communication interface and used by the driver module to control the drive signal for the LED array. As such, the light for general illumination is controlled by the ILM, and communications between the lighting fixture and the at least one remote entity are facilitated by the first ILM.

In essence, the intelligence as well as the sensing and external communication functions of the lighting fixture are provided by the ILM. The driver module simply drives the LED array based on instructions provided by the ILM. In one embodiment, the lighting fixture and the ILM are configured such that one ILM is easily replaced with another ILM in case an ILM fails or the sensing or communication capability of the lighting fixture needs to be changed. Notably, replacing the ILM will not affect the driver module, which may remain with the lighting fixture and is often specially tuned or mated with the LED array of the lighting fixture.

For example, if a sensor or the control circuitry of one ILM fails, the faulty ILM is easily replaced with a new ILM equipped with the same type of sensors and communication capabilities as the faulty ILM. Alternatively, an original ILM that only has an ambient light sensor and an occupancy sensor is easily replaced with a new ILM that has light, occupancy, and chemical sensors; image and vibration sensors; or the like. The types of sensors and possible sensor combinations for the ILM are virtually limitless.

Prior to delving into the details of the present disclosure, an overview of an exemplary lighting fixture incorporating the concepts described above is provided. While the concepts of the present disclosure may be employed in any type of lighting system, the immediately following description describes these concepts in a troffer-type lighting fixture, such as the lighting fixture 10 illustrated in FIGS. 1-3. This particular lighting fixture is substantially similar to the CR and CS series of troffer-type lighting fixtures that are manufactured by Cree, Inc. of Durham, N.C.

Figure 2:
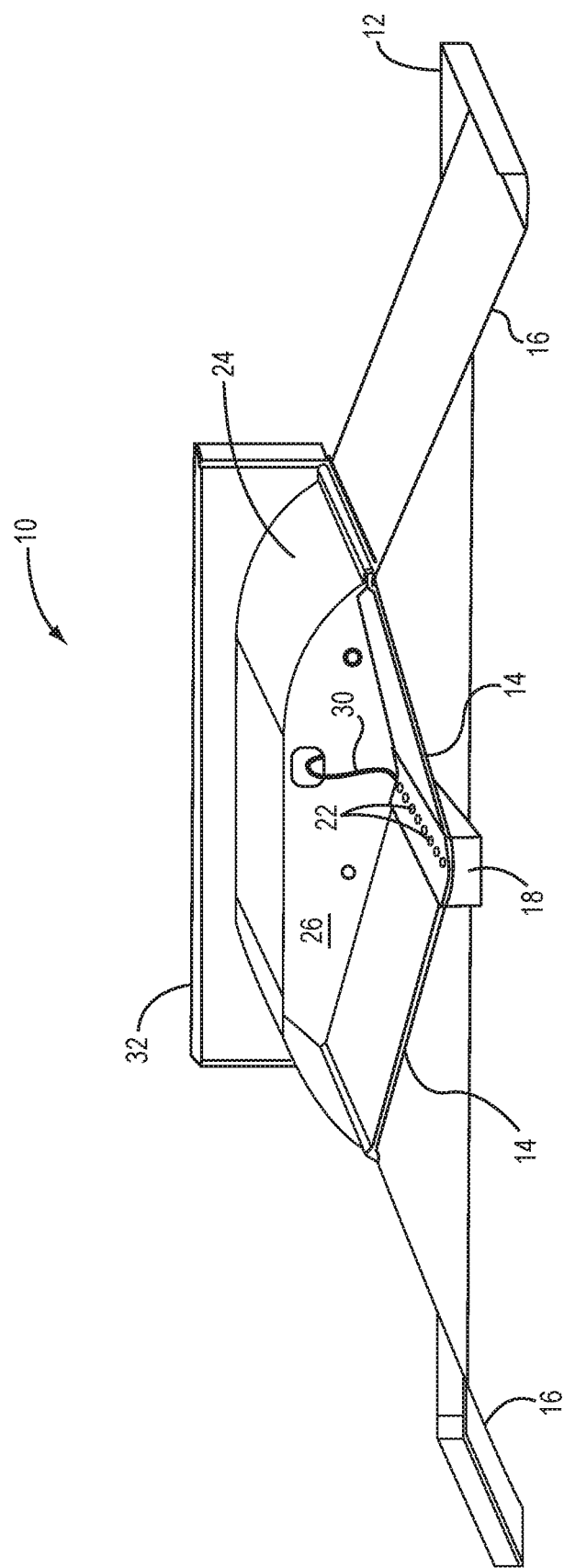
FIG. 2 is a cross-section of the lighting fixture of FIG. 1.
Figure 3:
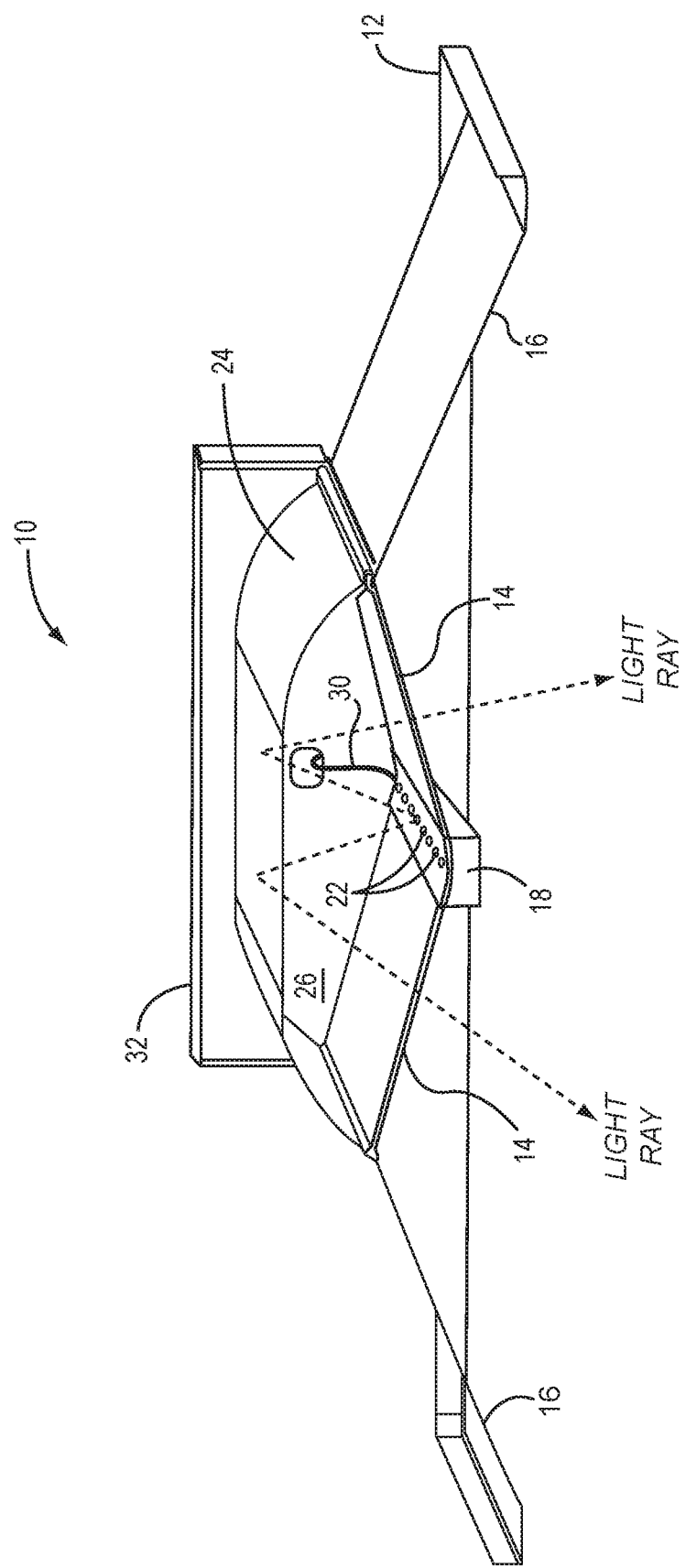
FIG. 3 is a cross-section of the lighting fixture of FIG. 1 illustrating how light emanates from the LEDs of the lighting fixture and is reflected out through lenses of the lighting fixture.

In general, troffer-type lighting fixtures, such as the lighting fixture 10, are designed to mount in, on, or from a ceiling. In most applications, the troffer-type lighting fixtures are mounted into a drop ceiling (not shown) of a commercial, educational, or governmental facility. As illustrated in FIGS. 1-3, the lighting fixture 10 includes a square or rectangular outer frame 12. In the central portion of the lighting fixture 10 are two rectangular lenses 14, which are generally transparent, translucent, or opaque. Reflectors 16 extend from the outer frame 12 to the outer edges of the lenses 14. The lenses 14 effectively extend between the innermost portions of the reflectors 16 to a central mounting member 18, which may double as a heatsink and functions in this embodiment to join the two inside edges of the lenses 14. As described in detail further below, an intelligent lighting module (ILM) 20 may be mounted in, on, or to the central mounting member 18 or any other suitable portion of the lighting fixture 10. The ILM 20 provides intelligence for the lighting fixture 10, houses one or more sensors, and facilitates wired and/or wireless communications with other lighting fixtures 10, networking entities, control entities, and the like. As noted, further details are provided below. The communications with other lighting fixtures 10 may relate to sharing state information and sensor information, as well as providing instructions or other information that aids in the control of the lighting fixtures 10 individually or as a group during normal operation or commissioning. For example, the lighting fixtures 10 may employ lightcasting to recognize the presence of each other and form groups based on such recognition. For further information on lightcasting, group formation, and general lighting operation, please see U.S. patent application Ser. No. 15/192,308, filed Jun. 24, 2016; Ser. No. 15/192,479, filed Jun. 24, 2016; Ser. No. 15/192, 035, filed Jun. 24, 2016; Ser. No. 15/191,846, filed Jun. 24, 2016; and Ser. No. 15/191,753, filed Jun. 24, 2016, which are incorporated herein by reference.

Turning now to FIGS. 2 and 3 in particular, the back side of the central mounting member 18 provides a mounting structure for a solid-state light source, such as an LED array 22, which includes one or more rows of individual LEDs mounted on an appropriate substrate. The LEDs are oriented to primarily emit light upwards toward a concave cover 24. The volume bounded by the cover 24, the lenses 14, and the back of the central mounting member 18 provides a mixing chamber 26. As such, light will emanate upwards from the LEDs of the LED array 22 toward the cover 24 and will be reflected downward through the respective lenses 14, as illustrated in FIG. 3. Notably, not all light rays emitted from the LEDs will reflect directly off of the bottom of the cover 24 and back through a particular lens 14 with a single reflection. Many of the light rays will bounce around within the mixing chamber 26 and effectively mix with other light rays, such that a desirably uniform light is emitted through the respective lenses 14.

Those skilled in the art will recognize that the type of lenses 14, the type of LEDs, the shape of the cover 24, and any coating on the bottom side of the cover 24, among many other variables, will affect the quantity and quality of light emitted by the lighting fixture 10. As will be discussed in greater detail below, the LED array 22 may include LEDs of different colors, wherein the light emitted from the various LEDs mixes together to form a white light having a desired characteristic, such as spectral content (color or color temperature), color rendering index (CRI), output level, and the like based on the design parameters for the particular embodiment, environmental conditions, or the like.

If the central mounting member 18 functions as a heatsink, fins (not shown) may extend from the central mounting member 18 in any direction. If the fins extend from the bottom of the central mounting member 18, the fins may be visible from the bottom of the lighting fixture 10. Placing the LEDs of the LED array 22 in thermal contact along the upper side of the central mounting member 18 allows any heat generated by the LEDs to be effectively transferred to the bottom side of the central mounting member 18 for dissipation within the room in which the lighting fixture 10 is mounted.

Figure 4:
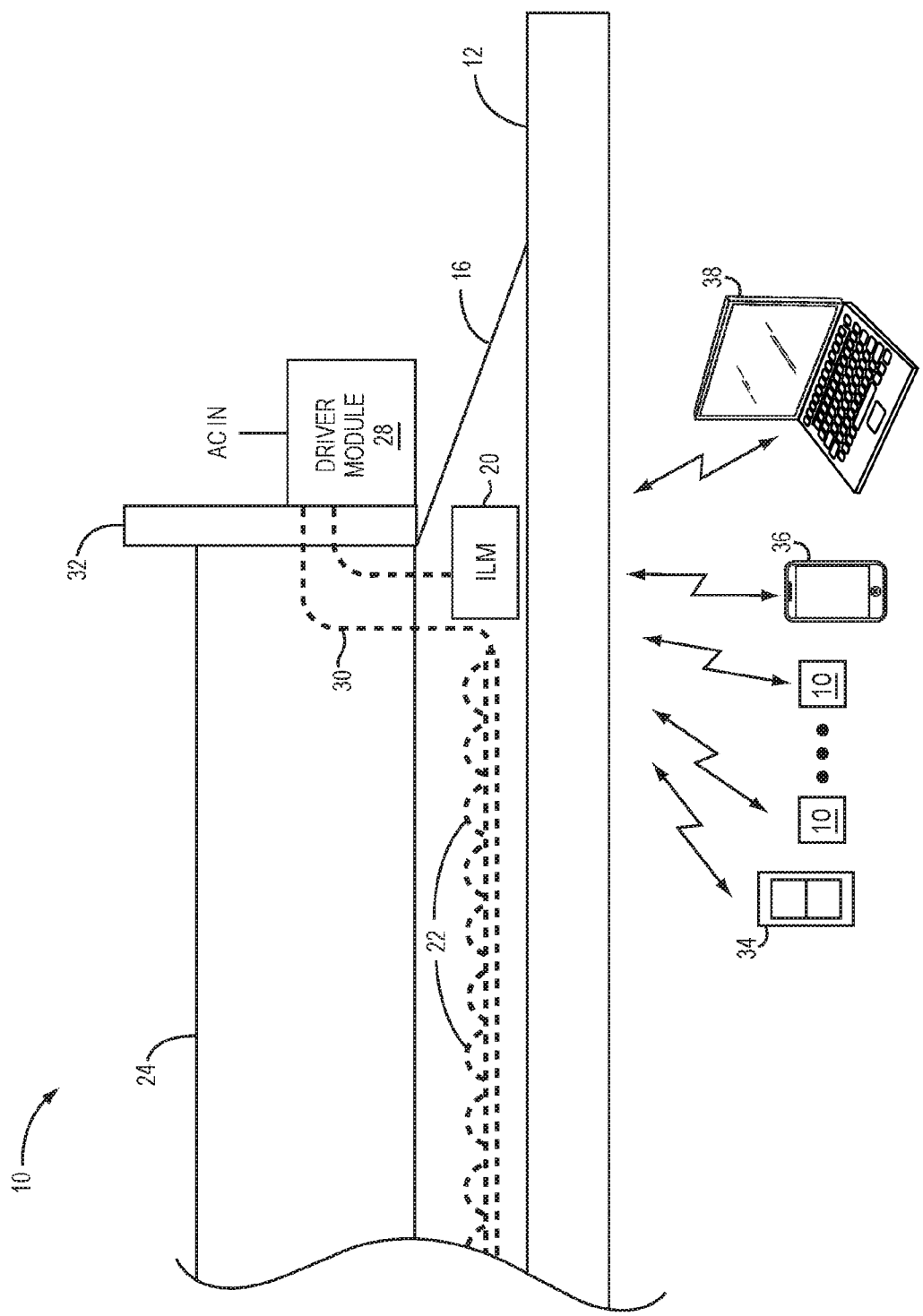
FIG. 4 illustrates a driver module, an LED array, and an intelligent lighting module (ILM) within the lighting fixture of FIG. 1.

As illustrated in FIG. 4, a driver module 28 is coupled to the LED array 22 and the ILM 20 through appropriate cabling 30 and is mounted to a driver mount 32 of the lighting fixture 10. The driver module 28 is used to drive the LED array 22 to provide a desired light output level in response to instructions from the ILM 20. The ILM 20 uses its internal logic to determine an on/off state and an output level based on information received from one or more of the integrated sensors, other lighting fixtures 10, and/or remote entities, such as wall controllers 34, mobile terminals 36, personal computers 38, and the like. The integrated sensors may include one or more ambient light, occupancy (motion), sound, temperature, humidity, pressure, vibration, carbon monoxide, carbon dioxide, air quality, smoke, image, power, or like sensors. The ILM 20 may also send information bearing on the state of the lighting fixture 10, sensor measurements, and the like to one or more of the other lighting fixtures 10, and/or remote entities, such as the wall controllers 34, the mobile terminals 36, personal computers 38, and the like. The ILM 20 may also send control information that is configured to cause other lighting fixtures 10, or groups thereof, to turn on, turn off, or transition to a desired light output level. As such, the lighting fixtures 10 may communicate with one another to share sensor measurements and state information, such that desired groups of lighting fixtures 10 act in unison in response to sensed environmental conditions, state information, sensor measurements or instructions from other lighting fixtures 10 or control entities, or a combination thereof.

Figure 5:
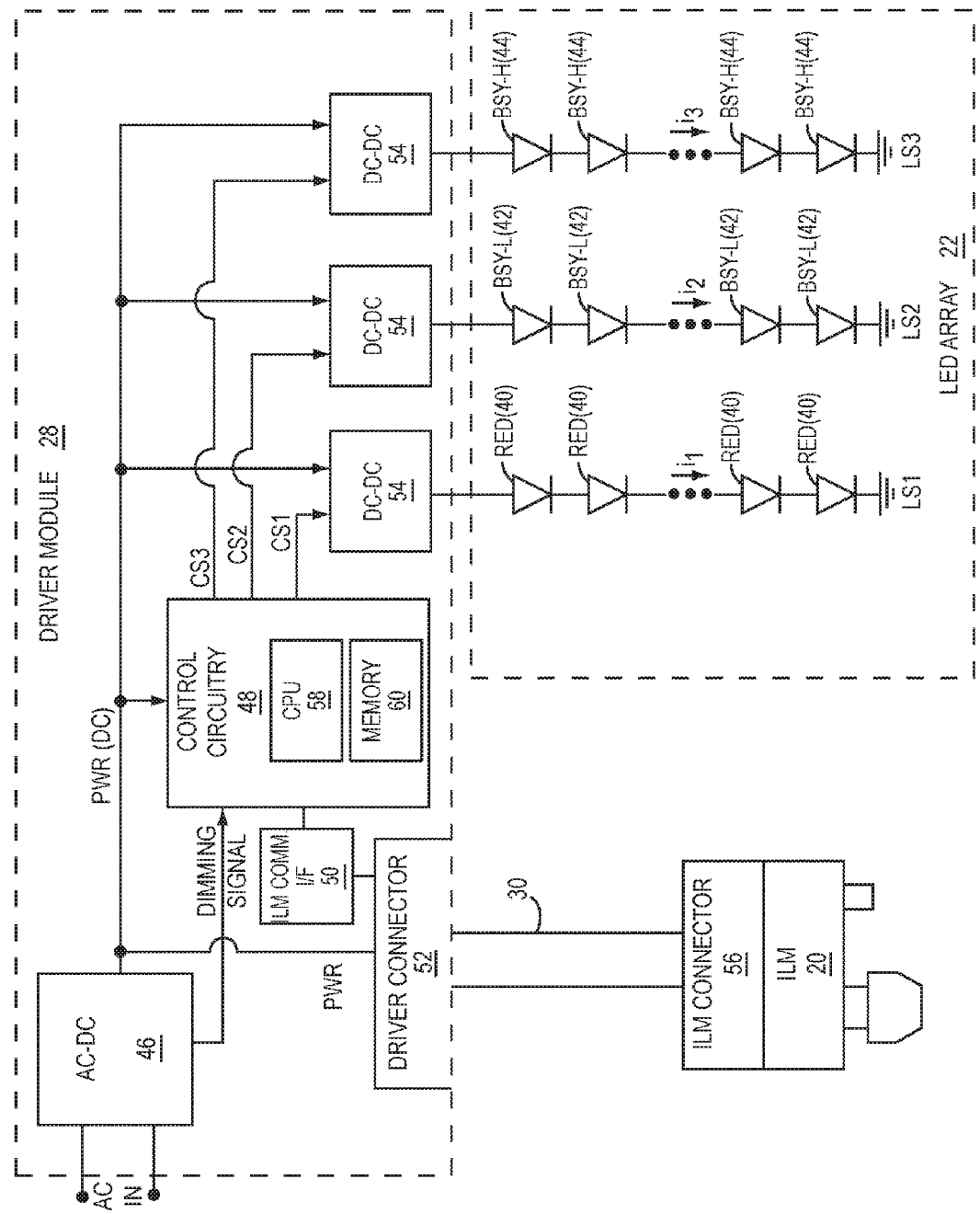
FIG. 5 illustrates a driver module provided in an electronics housing and a communications module in an associated housing coupled to the exterior of the electronics housing.

FIG. 5 provides an exemplary schematic of the driver module 28, the LED array 22, and the ILM 20. In the illustrated embodiment, the LED array 22 may include a mixture of LEDs of different colors. While those skilled in the art will recognize various color combinations, the following example employs red LEDs 40 that emit reddish light at a first wavelength, blue shifted yellow (BSY) LEDs 42 that emit yellowish/greenish light at a second wavelength, and BSY LEDs 44 that emit yellowish/greenish light at a third wavelength, which is different than the second wavelength. The LED array 22 may be divided into multiple strings of series connected LEDs. In essence, LED string LS1, which includes a number of red LEDs 40, forms a first group of LEDs. LED string LS2, which includes BSY LEDs 42, forms a second group of LEDs. LED string LS3, which includes BSY LEDs 44, forms a third group of LEDs.

In general, the driver module 28 controls the drive currents $i_1$, $i_2$, and $i_3$, which are used to drive the respective LED strings LS1, LS2, and LS3. The ratio of drive currents $i_1$, $i_2$, and $i_3$ that are provided through respective LED strings LS1, LS2, and LS3 may be adjusted to effectively control the relative intensities of the reddish light emitted from the red LEDs 40 of LED string LS1, the yellowish/greenish light emitted from the BSY LEDs 42 of LED string LS2, and the yellowish/greenish light emitted from the BSY LEDs 44 of LED string LS3. The resultant light from each LED string LS1, LS2, and LS3 mixes to generate an overall light output that has a desired color, correlated color temperature (CCT), and intensity, the latter of which may also be referred to a dimming level. As noted, the overall light output may be white light that falls on or within a desired proximity of the Black Body Locus (BBL) and has a desired CCT.

The number of LED strings LSx may vary from one to many and different combinations of LED colors may be used in the different strings. Each LED string LSx may have LEDs of the same color, variations of the same color, or substantially different colors. In the illustrated embodiment, each LED string LS1, LS2, and LS3 is configured such that all of the LEDs 40, 42, 44 that are in the string are all essentially identical in color. However, the LEDs 40, 42, 44 in each string may vary substantially in color or be completely different colors in certain embodiments. In another embodiment, three LED strings LSx with red, green, and blue LEDs may be used, wherein each LED string LSx is dedicated to a single color. In yet another embodiment, at least two LED strings LSx may be used, wherein the same or different colored BSY or blue shifted green (BSG) LEDs are used in one of the LED strings LSx and red LEDs are used in the other of the LED strings LSx. A single string embodiment is also envisioned, where currents may be individually adjusted for the LEDs of the different colors using bypass circuits, or the like.

The driver module 28 depicted in FIG. 5 includes AC-DC conversion circuitry 46, control circuitry 48, an ILM communication interface (I/F) 50, a driver connector 52, and a number of current sources, such as the illustrated DC-DC converters 54. The AC-DC conversion circuitry 46 is configured to receive an AC power signal (AC IN), rectify the AC power signal, correct the power factor of the AC power signal, and provide a DC power signal (PWR). The DC power signal may be used to directly or indirectly power the control circuitry 48 and any other circuitry provided in the driver module 28, including the DC-DC converters 54 and the ILM communication interface (I/F) 50. The DC power signal may also be provided to the driver connector 52 to power the ILM 20. The cabling 30 may extend from the driver connector 52 to an ILM connector 56, which may be mounted to or in the central mounting member 18 (FIGS. 1-4) or other portion of the lighting fixture 10. In one embodiment, the ILM connector 56 is configured to releasably engage the ILM 20. When the cabling 30 is connected and the ILM 20 is engaged with the ILM connector 56, the ILM 20 can receive the DC power signal as well as communicate bidirectionally with the control circuitry 48 of the driver module 28 via the ILM communication interface 50 using proprietary or standard communication protocols.

To control the light output of the LED array 22, the ILM 20 will determine a desired light output level based on one or more of the factors described above and send an instruction to the driver module 28. The driver module 28 will receive the instruction, determine the desired light output level from the instruction, and drive the LED array 22 in a manner to provide the light output level. The driver module 28 may acknowledge receipt of the instruction and/or provide sufficient feedback to the ILM 20 that the LED array 22 is being driven according to the instruction. From an off state, the ILM 20 may instruct the driver module 28 to turn on and drive the LED array 22 to provide a particular light output level in response to determining that the lighting fixture 10 should turn on. From an on state, the ILM 20 may instruct the driver module 28 to stop driving the LED array 22 in response to determining that the lighting fixture 10 should turn off.

In response to an instruction by the ILM 20 to output light at a particular light output level, the three respective DC-DC converters 54 of the driver module 28 provide drive currents $i_1$, $i_2$, and $i_3$ for the three LED strings LS1, LS2, and LS3 in response to control signals CS1, CS2, and CS3. The control signals CS1, CS2, and CS3 may be pulse width modulated (PWM) signals that effectively turn the respective DC-DC converters 54 on during a logic high state and off during a logic low state of each period of the PWM signal. As a result, the drive currents $i_1$, $i_2$, and $i_3$ for the three LED strings LS1, LS2, and LS3 may also be PWM signals. The intensity of light emitted from each of the three LED strings LS1, LS2, and LS3 will vary based on the duty cycle of the respective PWM signals. The control circuitry 48 will adjust the duty cycle of the drive currents $i_1$, $i_2$, and $i_3$ provided to each of the LED strings LS1, LS2, and LS3 to effectively adjust the intensity of the resultant light emitted from the LED strings LS1, LS2, and LS3 while maintaining the desired CCT based on instructions from the ILM 20. In an alternative embodiment, the drive currents $i_1$, $i_2$, and $i_3$ for the three LED strings LS1, LS2, and LS3 may be variable DC currents instead of PWM signals. In certain instances, a dimming device, such as a wall controller, may control the AC power signal, provide a separate a 0-10 volt DC signal, or the like to the driver module 28. The AC-DC conversion circuitry 46 or other electronics may be configured to detect the relative amount of dimming associated with the AC power signal or 0-10 volt DC signal and provide a corresponding dimming signal (DIMMING SIGNAL) to the control circuitry 48 of the driver module 28. The control circuitry 48 may pass information based on the dimming signal to the ILM 20 via the ILM communication interface 50. The ILM 20 can take the dimming information into consideration when providing instructions to the driver module 28.

The control circuitry 48 may include a central processing unit (CPU) 58 and sufficient memory 60 to enable the control circuitry 48 to bidirectionally communicate with the ILM 20 through the ILM communication interface 50 using a defined protocol, such as the Digital Addressable Lighting Interface (DALI) or DALI2. The control circuitry 48 may receive data or instructions from the ILM 20 and take appropriate action to process the data and implement the received instructions. The instructions may range from controlling how the LED array 22 is driven to returning operational data of the driver module 28 to the ILM20.

Notably, when the term "control system" is used in the claims or generically in the specification, the term should be construed broadly to include the hardware and any additional software or firmware that is needed to provide the stated functionality. The term "control system" should not be construed as only software, as electronics are needed to implement control systems described herein. For example, a control system may, but does not necessarily, include the control circuitry 48, the DC-DC converters 54, the AC-DC conversion circuitry 46, and the like.

Figure 6:
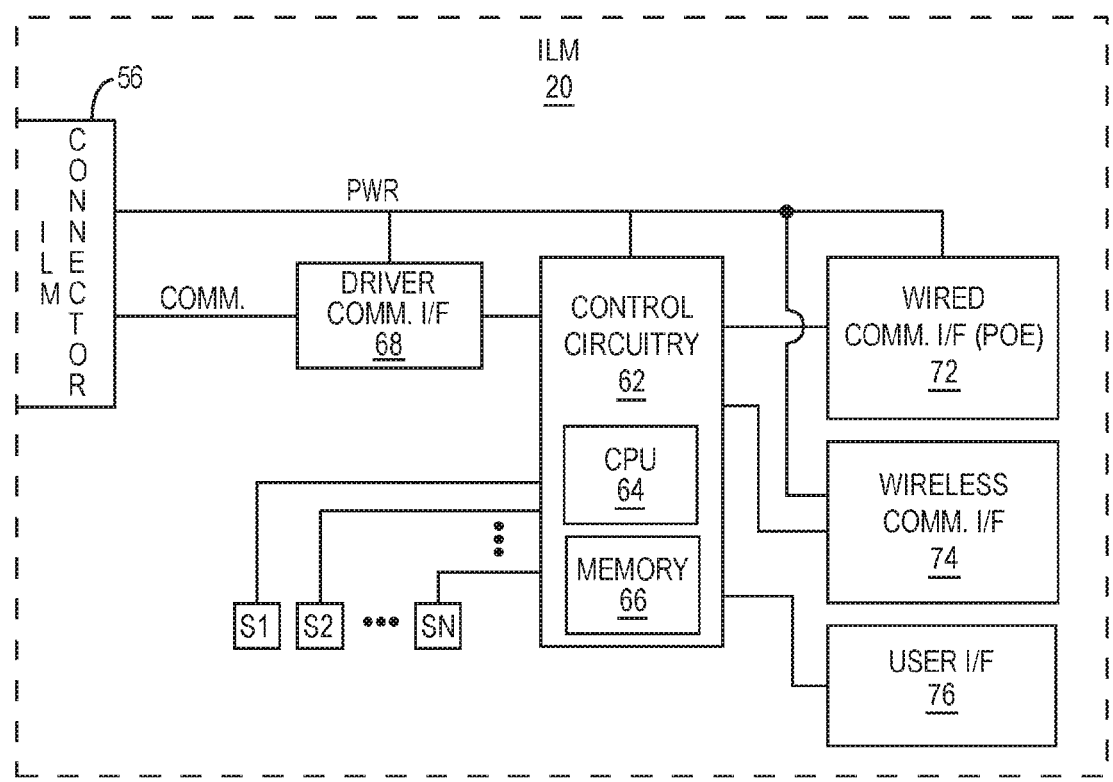
FIG. 6 is a block diagram of an ILM according to one embodiment of the disclosure.

With reference to FIG. 6, a block diagram of one embodiment of the ILM 20 is illustrated. The ILM 20 includes control circuitry 62 having an associated CPU 64 and memory 66, which contains the requisite software instructions and data to facilitate operation as described herein. The control circuitry 62 may be associated with a driver communication interface 68, which is to be coupled to the driver module 28, directly or indirectly via the ILM connector 56. The control circuitry 62 may be associated with a wired communication interface 72, a wireless communication interface 74, or both, to facilitate wired or wireless communications with other lighting fixtures 10, and/or remote entities, such as wall controllers 34, mobile terminals 36, personal computers 38, and the like. The wireless communication interface 74 may include the requisite transceiver electronics to facilitate wireless communications with remote entities using any number of wireless communication protocols. The wired communication interface 72 may support universal serial (USB), Ethernet, or like interfaces using any number of wired communication protocols.

In one embodiment, the ILM 20 may receive power in the form of a DC signal from the driver module 28 via the ILM connector 56 and facilitate communications with the driver module 28 via the driver communication interface 68 and the ILM connector 56. Communications with other lighting fixtures 10 and/or remote entities, such as wall controllers 34, mobile terminals 36, personal computers 38, and the like are facilitated via the wired or wireless communication interfaces 72, 74.

In an alternative embodiment, the ILM 20 will receive power in the form of a DC power signal via the wired communication interface 72, which may be configured as a power over Ethernet (PoE) interface. The DC power signal received via the wired communication interface 72 is used to power the electronics of the ILM 20 and is passed to the driver module 28 via the ILM connector 56. The driver module 28 will use the DC power signal to power the electronics of the driver module 28 and drive the LED array 22. Communications with other lighting fixtures 10 and/or remote entities, such as wall controllers 34, mobile terminals 36, personal computers 38, and the like are facilitated via the wired communication interface 72. The ILM 20 will facilitate communications with the driver module 28 via the driver communication interface 68 and the ILM connector 56.

As noted, the ILM 20 includes multiple integrated sensors S1-SN, which are directly or indirectly coupled to the control circuitry 62. The sensors S1-SN may include one or more ambient light, occupancy (motion), sound, temperature, humidity, pressure, vibration, carbon monoxide, carbon dioxide, air quality, smoke, power, image, or like sensors. The sensors S1-SN provide sensor data to the control circuitry 62. Based on internal logic, the ILM 20 will determine how the driver module 28 should drive the LED array 22 based on the sensor data and any other data or instructions received from remote entities, such as other lighting fixtures 10, wall controllers 34, mobile terminals 36, personal computers 38, and the like. Based on how the driver module 28 should drive the LED array 22, the ILM 20 will generate and send appropriate instructions to the driver module 28 via the driver communication interface 68 and the ILM connector 56. The driver module 28 will drive the LED array 22 based on the instructions received from the ILM 20. These instructions may result in the driver module 28 turning off the LED array 22, turning on the LED array 22 to a certain light output level, changing the light output level provided by the LED array 22, changing the color or CCT of the light output, and the like.

In addition to controlling the driver module 28 to control the light output of the LED array 22, the ILM 20 may play an important role in coordinating intelligence and sharing data among the lighting fixtures 10. In addition to receiving data and instructions from other lighting fixtures 10 or remote control entities and using such information to control the driver module 28, the ILM 20 may also provide instructions to other lighting fixtures 10 and remote control entities based on the sensor data from its integrated sensors S1-SN as well as the sensor data and instructions received from the other lighting fixtures 10 and remote control entities.

The ILM 20 may have a user interface 76 that provides information related to the state or operation of the ILM 20, allows a user to manually provide information to the ILM 20, or a combination thereof. As such, the user interface 76 may include an input mechanism, an output mechanism, or both. The input mechanism may include one or more of buttons, keys, keypads, touchscreens, microphones, or the like. The output mechanism may include one more LEDs, a display, or the like. For the purposes of this application, a button is defined to include a push button switch, all or part of a toggle switch, rotary dial, slider, or any other mechanical input mechanism.

Figure 7A:
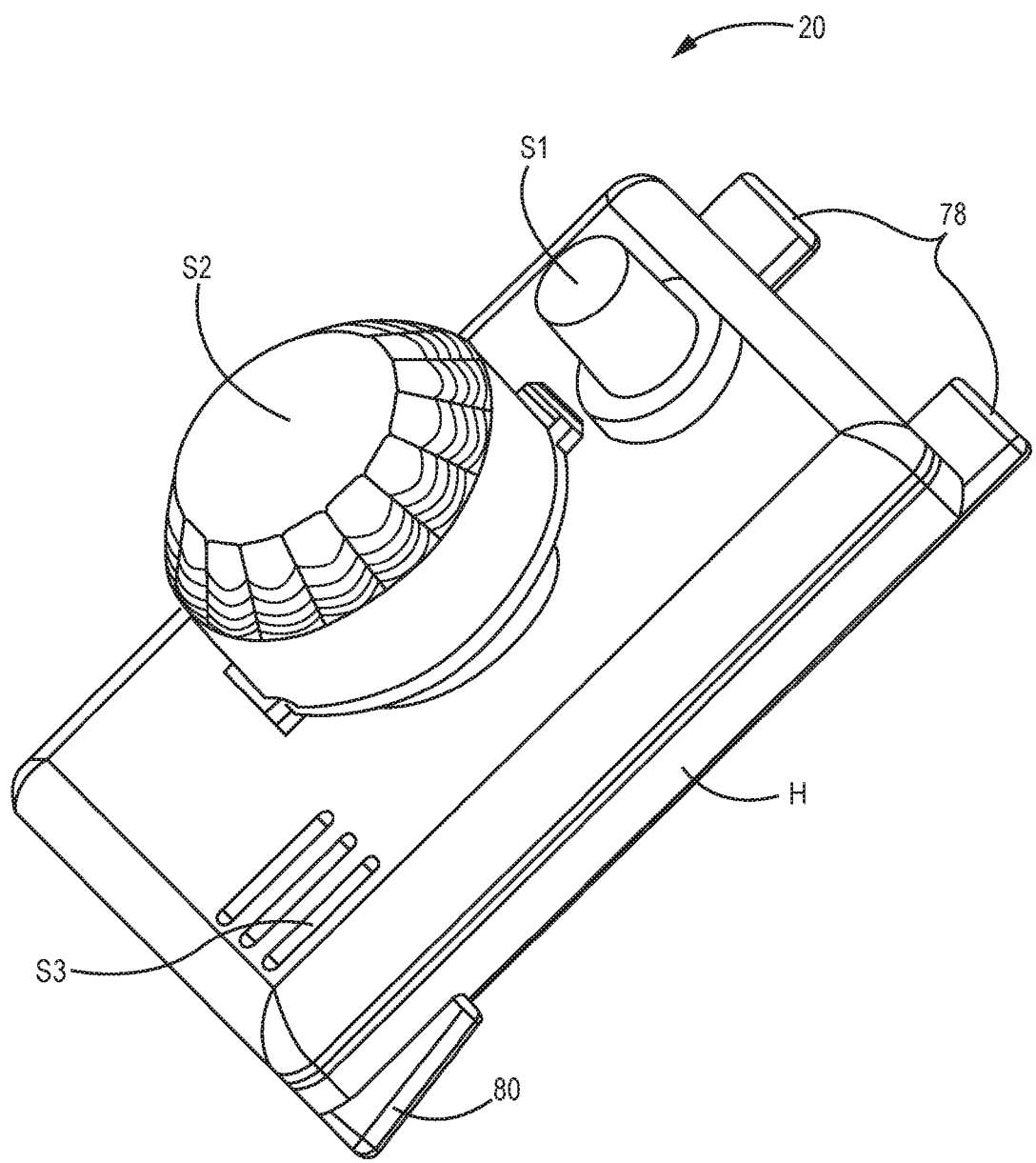
FIG. 7A is a top isometric view of an ILM according to a first embodiment of the disclosure.
Figure 7B:
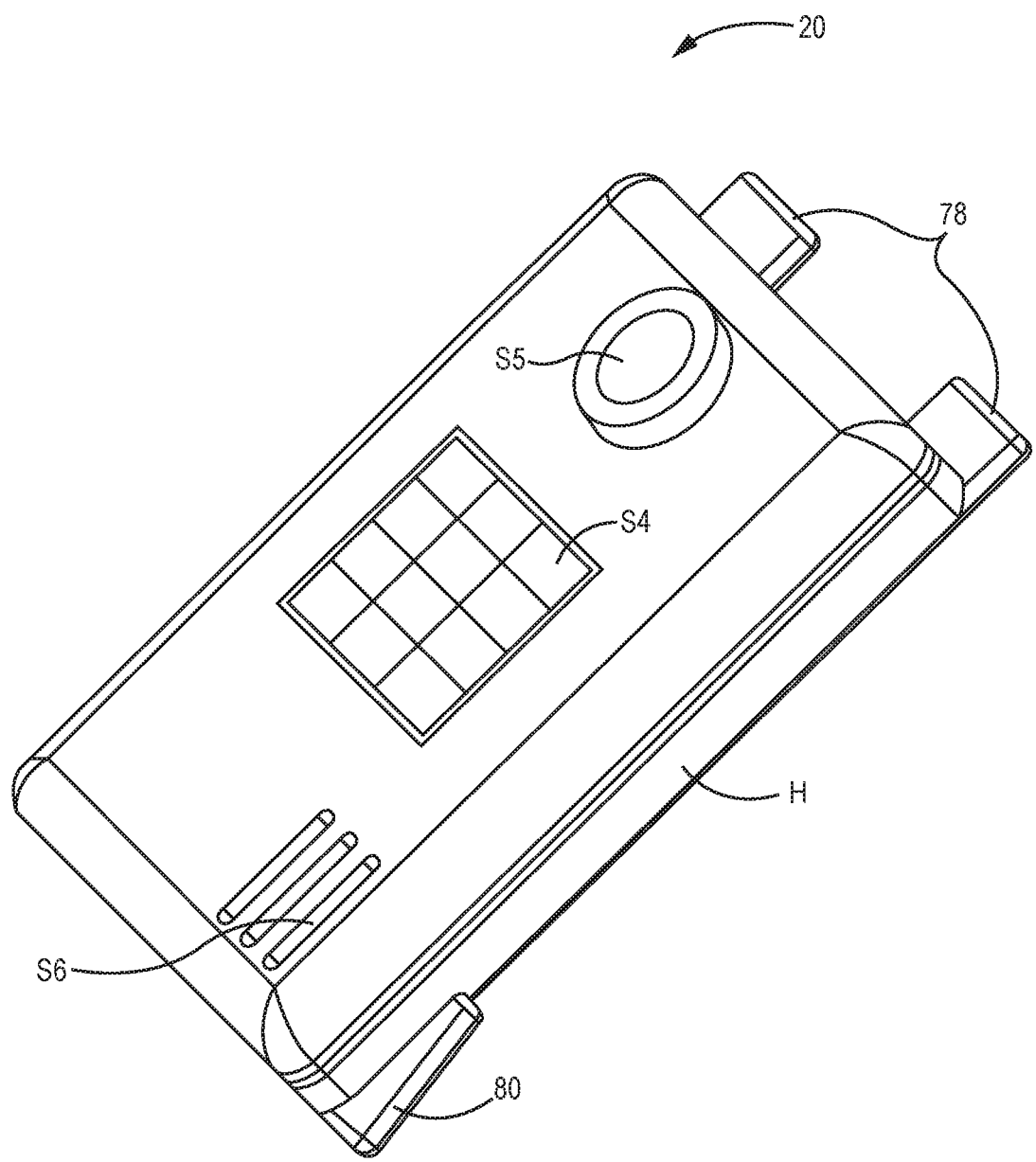
FIG. 7B is a top isometric view of an ILM according to a second embodiment of the disclosure.

A first exemplary ILM 20 is illustrated in FIG. 7A. The ILM 20 has a housing H in or on which sensors S1, S2, and S3 and the electronics described above are mounted. In this particular, but non-limiting, embodiment, sensor S1 is an ambient light sensor, sensor S2 is an occupancy sensor, and sensor S3 is a pressure sensor mounted behind three openings that are provided in the housing H. FIG. 7B illustrates another sensor configuration for the ILM 20 that includes an image sensor S4, a vibration sensor S5, and a microphone S6, wherein the image sensor S4 may be configured and used to monitor ambient light, detect occupancy, recognize people or objects, and the like.

Figure 8:
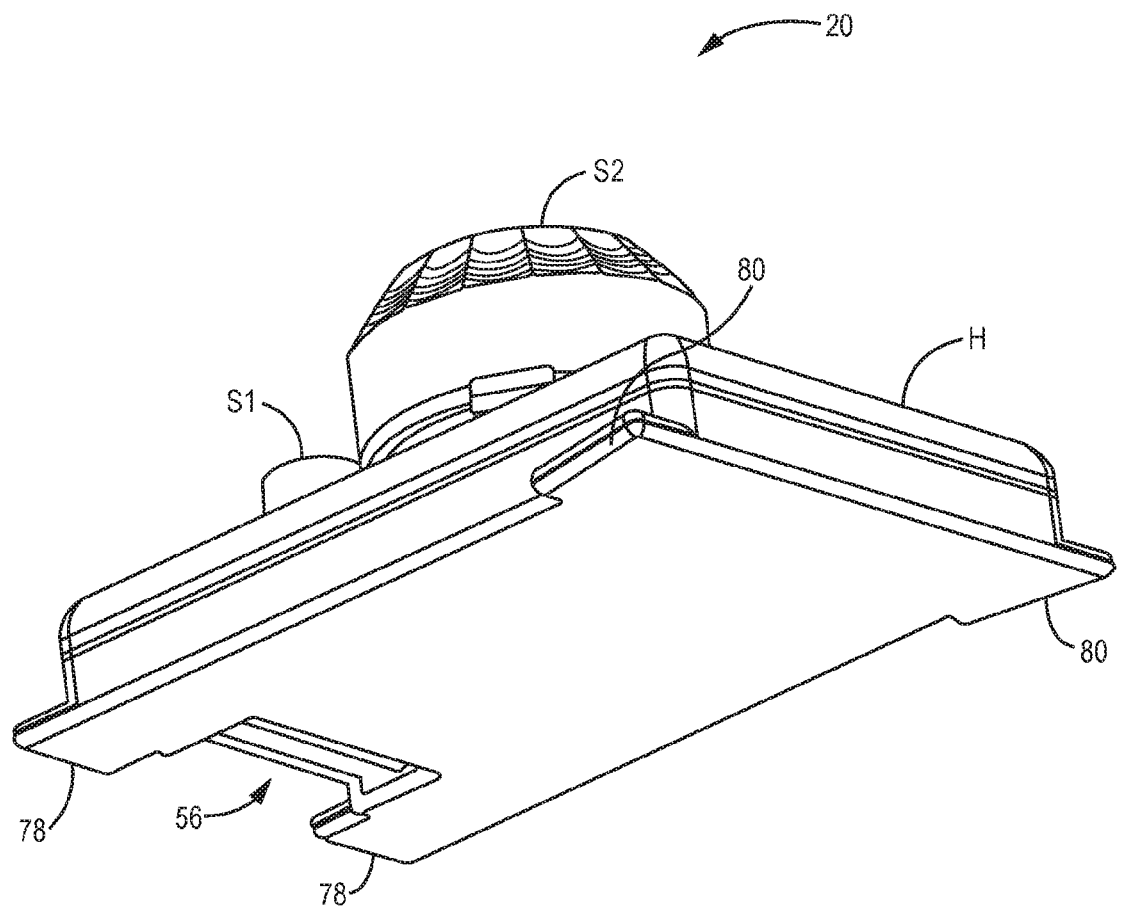
FIG. 8 is a bottom isometric view of an ILM according to the embodiment of FIG. 7A.

In this instance, the housing H of the ILM 20 is configured to releasably engage a compatible cradle (not shown) or the like provided by the lighting fixture 10 in a snap-fit manner. As illustrated in FIGS. 7A, 7B, and 8, the housing H may include two front tabs 78 that extend outward from a bottom portion of the front wall of the housing H. Further, opposing side tabs 80 extend outward from bottom portions of opposing side walls of the housing H. The side tabs 80 are biased toward the rear wall of the housing H.

Figure 9:
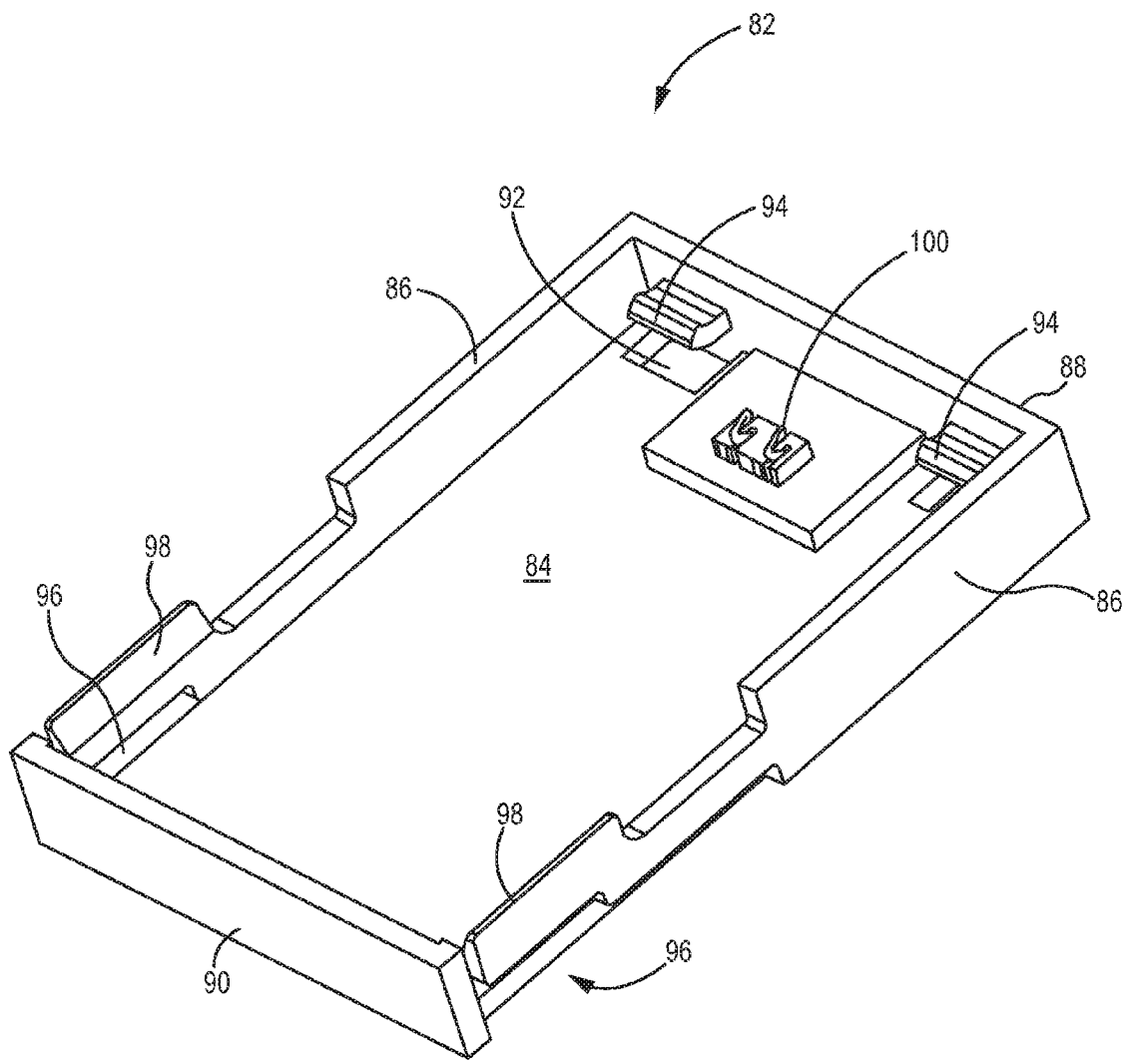
FIG. 9 is a top isometric view of a cradle for receiving the ILM of FIG. 7A according to one embodiment of the disclosure.

FIG. 9 illustrates an exemplary cradle 82, which is configured to receive the ILM 20 of FIG. 7A. The cradle 82 may be integrated into a portion of the lighting fixture 10, such as the central mounting member 18 or other structural member of the lighting fixture 10. The cradle 82 may be a separate component that is mounted within the members, or the structural members may be modified to provide the cradle 82.

The cradle 82 is defined by a bottom wall 84, two opposing side walls 86, a front wall 88, and a rear wall 90. The opposing sidewalls 86, the front wall 88, and the rear wall 90 are perpendicular to and extend from the perimeter of the bottom wall 84. The bottom wall 84 includes two front openings 92 adjacent to and potentially extending into the front wall 88. Two front wings 94 extend inward from the front wall 88 and reside directly above the corresponding front openings 92. As illustrated further below, the front openings 92 temporarily receive the front tabs 78 of the ILM 20 as the ILM 20 is being inserted into the cradle 82. The front tabs 78 of the ILM 20 are designed to slide below the bottom sides of the front wings 94. Each side wall 86 has a side opening 96 adjacent a side spring tab 98. The side openings 96 are configured to receive the side tabs 80 of the ILM 20. The side spring tabs 98 are designed to spring outward enough to allow the side tabs 80 of the ILM 20 to reach the side openings 96, when the ILM 20 is placed into the cradle 82. Details are provided further below.

A cradle connector 100 is provided on the bottom wall 84 of the cradle 82 and will provide an electrical connection with the ILM connector 56 of the ILM 20, once the ILM 20 is positioned in the cradle 82. Appropriate cabling or other connector mechanism will provide the necessary electrical connections between the cradle connector 100 and the driver connector 52 of the driver module 28, such that the requisite electrical connections between the ILM 20 in the driver module 28 are provided.

Figure 10:
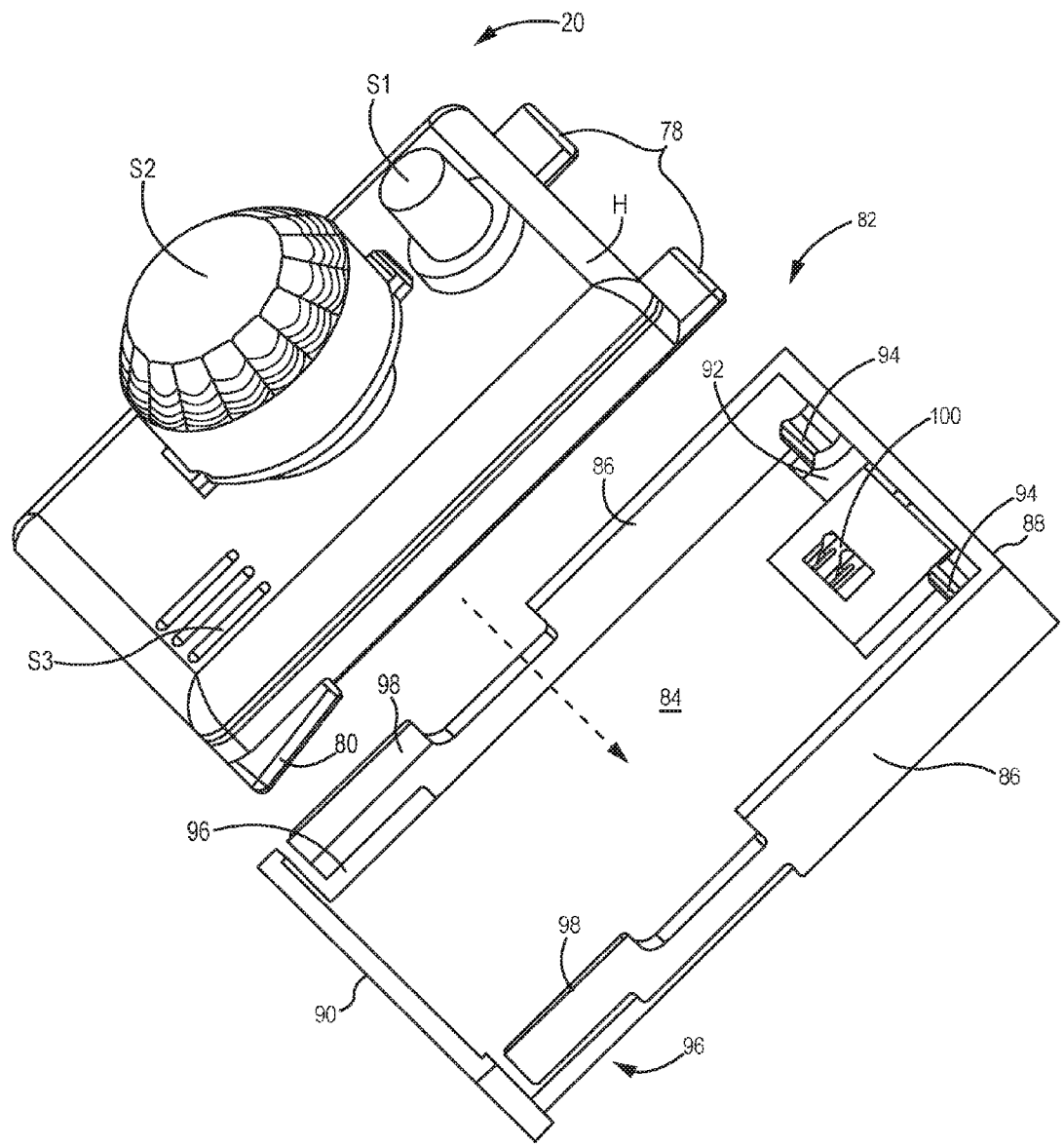
FIG. 10 illustrates the ILM prior to being inserted into the cradle according to one embodiment of the disclosure.
Figure 11:
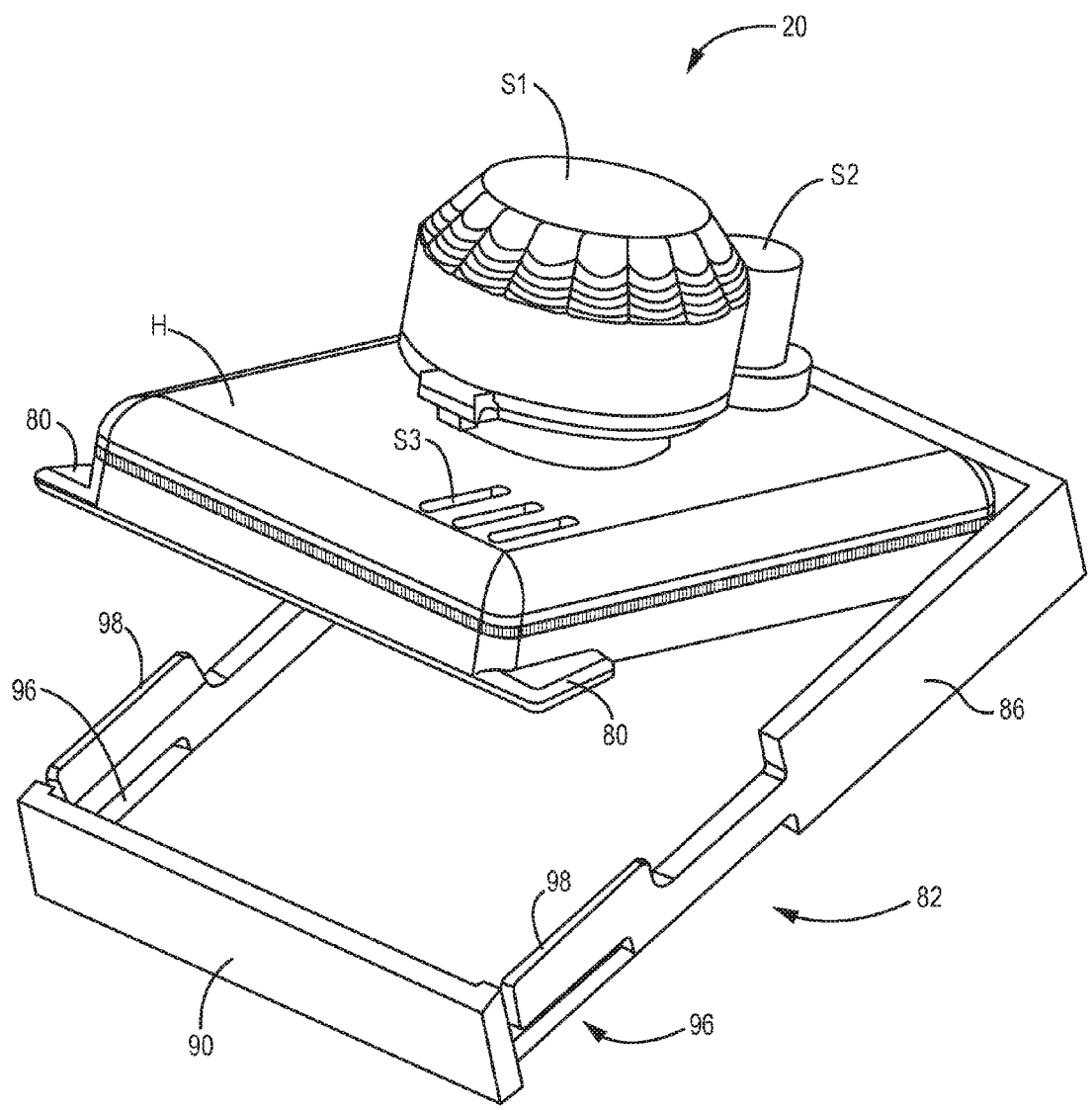
FIG. 11 illustrates the ILM partially inserted into the cradle according to one embodiment of the disclosure.
Figure 12:
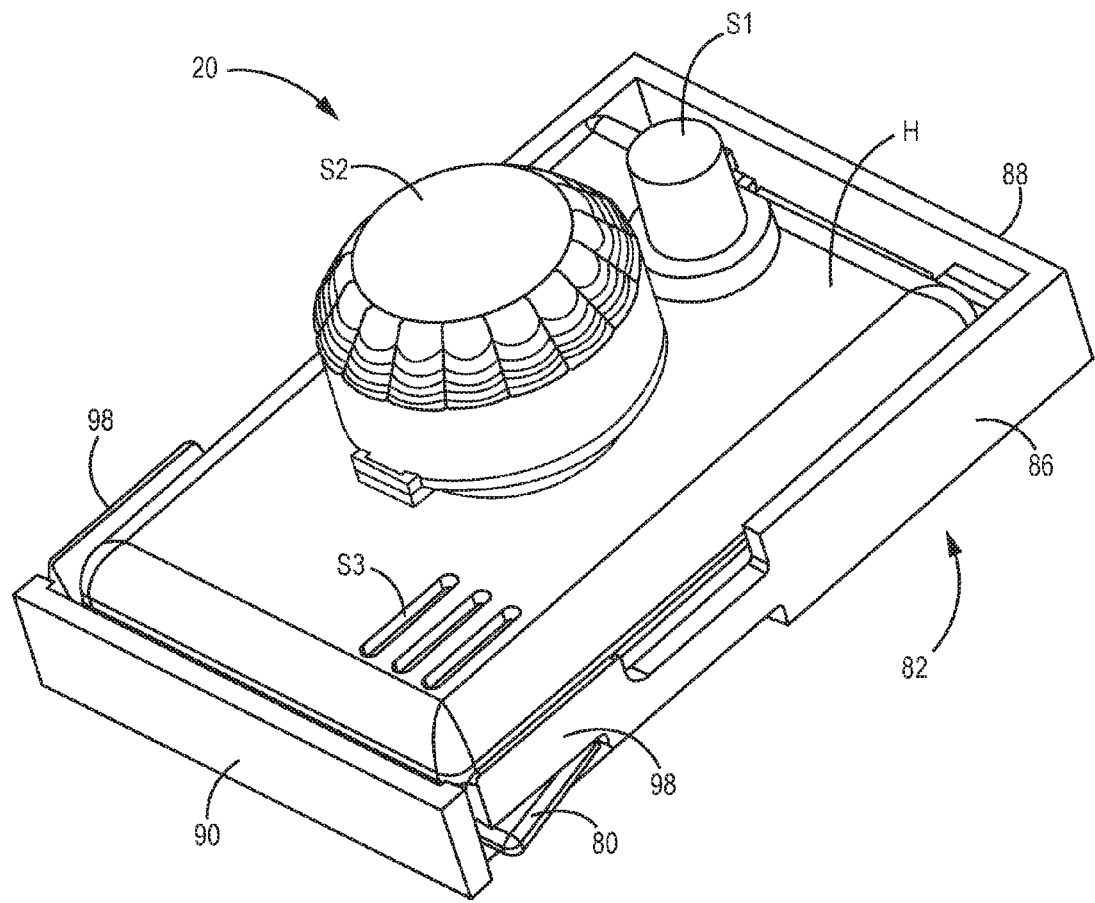
FIG. 12 illustrates the ILM fully inserted into the cradle according to one embodiment of the disclosure.

FIG. 10 illustrates the ILM 20 positioned above the cradle 82 prior to the ILM 20 being inserted into the cradle 82. FIG. 11 illustrates the ILM 20 being inserted into the cradle 82. At this point, the ILM 20 is angled relative to the cradle 82, and the front tabs 78 of the ILM 20 are respectively inserted into the front openings 92 and below the front wings 94 of the cradle 82. The rear portion of the ILM 20, including the side tabs 80, have not yet engaged the cradle 82. FIG. 12 illustrates the ILM fully inserted into the cradle 82. As the rear of the ILM 20 is inserted into the cradle 82, the side spring tabs 98 provided by the sidewalls 86 will flex outward to allow the side tabs 80 of the ILM 20 to slide by the side spring tabs 98 and reach the side openings 96. Once the side tabs 80 reach the side openings 96, the side spring tabs 98 of the sidewalls 86 will return to their normal position, wherein the side tabs 80 of the ILM 20 are confined between the bottom surfaces of the side spring tabs 98 and a top surface of the bottom wall 84. Further, the front tabs 78 of the ILM 20 are confined between the bottom surfaces of the front wings 94 and the top surface of the bottom wall 84. As a result, the ILM 20 is securely engaged in the cradle 82.

Figure 13:
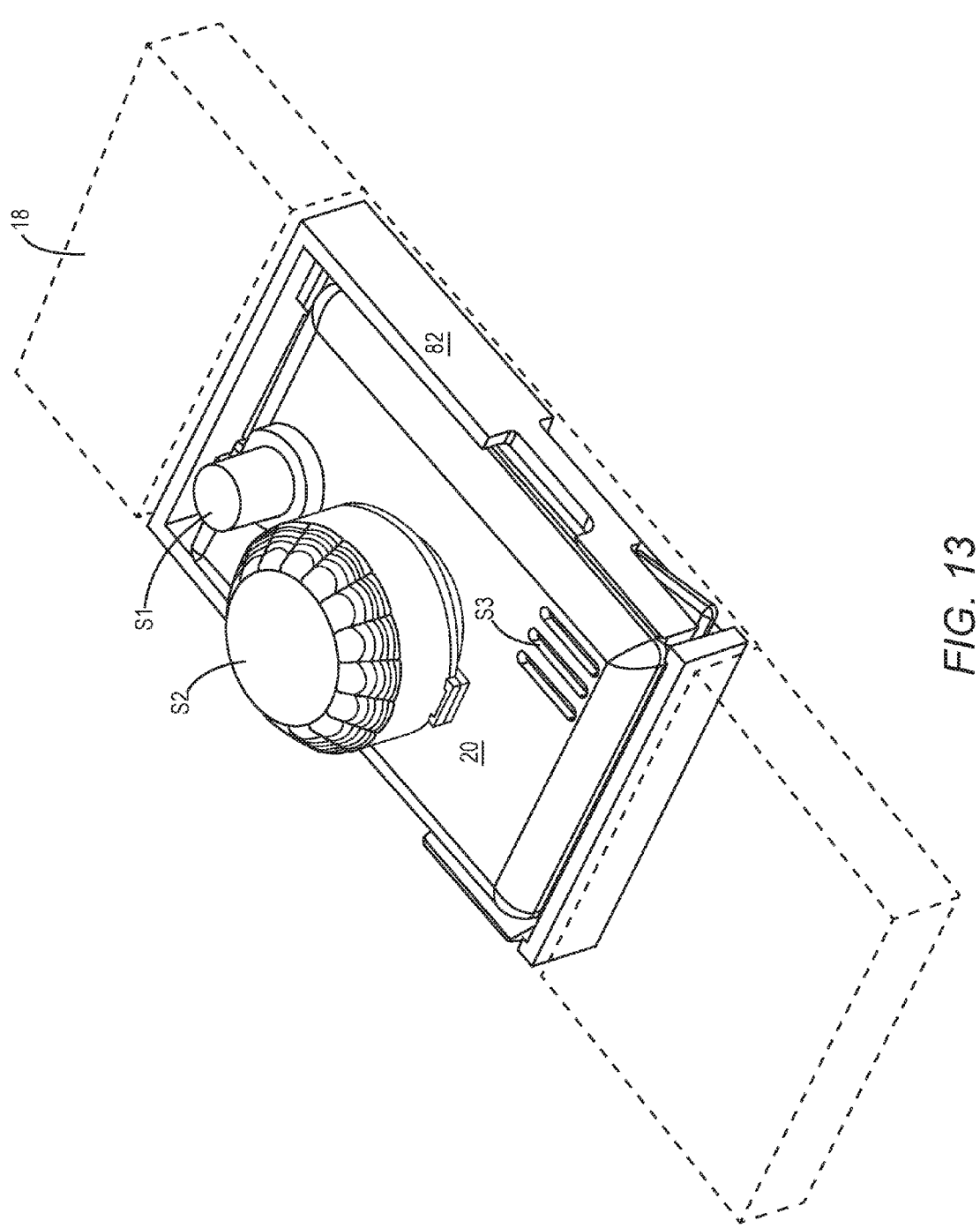
FIG. 13 illustrates a cradle integrated within a heatsink of the lighting fixture of FIG. 1, wherein the ILM is fully inserted into the cradle.

The ILM 20 may be removed from the cradle 82 by springing the side spring tabs 98 of the cradle 82 outward to release the side tabs 80 of the ILM 20 and pulling the ILM 20 from the cradle 82. FIG. 13 illustrates the cradle 82 mounted within the central mounting member 18 of the lighting fixture 10 and the ILM 20 mounted within the cradle 82. As noted above, the cradle 82 may be provided in a separate or integrated fashion anywhere on the lighting fixture 10. Generally, the cradle 82 is provided such that all or at least some of the sensors S1-SN are exposed to the same environment in which the lighting fixture 10 projects light via the LED array 22. In the illustrated embodiment, the cradle 82 is configured so that the ILM 20 is exposed to the environment that is being illuminated by the lighting fixture 10, and as such, the ILM 20 is easily removed from the cradle 82 once the lighting fixture 10 is installed in, on, or from a ceiling, wall, or like structure. A new ILM 20 is likewise easily installed in the cradle 82, since the cradle 82 is exposed to the environment once the lighting fixture 10 is installed.

Placing the sensors S1-SN, wired or wireless communication interfaces 72, 74, and overall control of the lighting fixture 10 in the ILM 20 provides significant benefits. First, if in ILM 20 fails, the faulty ILM 20 may be easily replaced with a new ILM 20 by simply removing the faulty ILM 20 and inserting the new ILM 20 in the lighting fixture 10. Importantly, the driver module 28, which is often tuned to and specifically matched with the LED array 22 of the lighting fixture 10, need not be replaced if there is a problem with the sensors S1-SN, wired or wireless communication interfaces 72, 74, or control circuitry 62 electronics of the ILM 20. Further, the complexity of the driver module 28 is significantly reduced by transitioning the sensors S1-SN, wired or wireless communication interface 72, 74, and overall control to the ILM 20. The driver module 28 remains focused on power conversion and driving the LED array 22.

A second benefit associated with the ILM 20 includes a relative ease in which the functionality of the lighting fixture 10 can be updated by simply replacing one ILM 20 with another. For example, assume the lighting fixture 10 is originally supplied with an ILM with only two sensors S1, S2, which are configured to sense ambient light and occupancy, respectively. As such, the lighting fixture 10 is limited to being able to sense ambient light and occupancy. Further assume that there is a desire to upgrade lighting fixture 10 to not only sense ambient light and occupancy, but also sense vibration and monitor audio in the associated environment. The original ILM 20, which only includes an ambient light sensor S1 and an occupancy sensor S2, may be easily replaced with a new ILM 20, which includes an ambient light sensor S1, an occupancy sensor S2, a pressure sensor S3, and a vibration sensor. The new control circuitry 62 of the ILM 20 is configured to handle the new sensors SN and will control the driver module 28 of the lighting fixture 10 based on its own internal logic. An ILM 20 may also be replaced with a new ILM 20 simply to provide upgraded sensors SN, wherein the sensing capability is the same. For example, an ILM 20 with a less sensitive and less accurate occupancy sensor S2 may be replaced with an ILM 20 with a more sensitive and more accurate occupancy sensor S2. As a result of configuring the ILM 20 as described above, the driver module 28 and LED array 22 of the lighting fixture 10 effectively appear as an interchangeable peripheral to the ILM 20.

When an ILM 20 in a lighting fixture 10 is replaced, the new ILM 20 may communicate with the other lighting fixtures 10 or remote entities in the associated lighting network and/or subgroup thereof as a new lighting fixture 10 or a replacement lighting fixture 10, depending on the desires of the lighting designer. When the new ILM 20 joins the lighting network and/or subgroup thereof, the new ILM 20 will report its capabilities to the other lighting fixtures 10 or remote entities, facilitate any necessary handshaking, and begin operating and/or sharing data based on its new capabilities.

Those skilled in the art will recognize improvements and modifications to the embodiments of the present disclosure. All such improvements and modifications are considered within the scope of the concepts disclosed herein and the claims that follow.

What is claimed is:

1. A lighting fixture comprising:
a light emitting diode (LED) light source that outputs light for general illumination in response to a drive signal;
a driver module configured to provide the drive signal in response to an intelligent lighting module (ILM) instruction; and
a first ILM that is separate from the driver module and comprises:
a first plurality of sensors that comprises at least two different types of sensors;
a first communication interface
a second communication interface; and
first control circuitry communicatively coupled with the first plurality of sensors, the first communication interface, and the second communication interface, and configured to:
communicate with at least one remote entity via the first communication interface;
generate the ILM instruction based on sensor data gathered from the first plurality of sensors; and
provide the ILM instruction to the driver module via the second communication interface, wherein the light for general illumination is controlled by the first ILM, and communications between the lighting fixture and the at least one remote entity are facilitated by the first ILM.

2. The lighting fixture of claim 1 wherein generation of the ILM instruction is further based on information received from the at least one remote entity via the first communication interface.

3. The lighting fixture of claim 2 wherein the information received from the at least one remote entity includes sensor data gathered by at least one sensor associated with the at least one remote entity.

4. The lighting fixture of claim 2 wherein the information received from the at least one remote entity includes an instruction from the at least one remote entity.

5. The lighting fixture of claim 2 wherein the at least one remote entity is another lighting fixture.

6. The lighting fixture of claim 2 wherein the at least one remote entity is a wall controller.

7. The lighting fixture of claim 1 wherein the first communication interface is a wireless communication interface configured to facilitate wireless communications.

8. The lighting fixture of claim 1 wherein the first communication interface is a wired communication interface configured to facilitate wired communications.

9. The lighting fixture of claim 1 wherein the driver module is configured to provide a DC power signal, and the ILM is powered by the DC power signal.

10. The lighting fixture of claim 9 wherein the driver module is configured to receive an AC power signal and generate the DC power signal from the AC power signal.

11. The lighting fixture of claim 1 further comprising a cradle configured to releasably engage the first ILM.

12. The lighting fixture of claim 11 wherein the cradle provides a snap-fit engagement with the first ILM.

13. The lighting fixture of claim 1 wherein the first ILM is replaceable with a second ILM, which comprises a second plurality of sensors, a third communication interface, a fourth communication interface, and control circuitry, which is configured to:
communicate with the at least one remote entity via the third communication interface;
generate the ILM instruction based on sensor data gathered from the second plurality of sensors; and
provide the ILM instruction to the driver module via the fourth communication interface, wherein the light for general illumination is controlled by the second ILM, and the communications between the lighting fixture and the at least one remote entity are facilitated by the second ILM once the first ILM is replaced with the second ILM.

14. The lighting fixture of claim 13 wherein the first plurality of sensors and the second plurality of sensors comprise a same number and a same type of sensors.

15. The lighting fixture of claim 13 wherein the first plurality of sensors and the second plurality of sensors comprise at least one different type of sensor.

16. The lighting fixture of claim 13 wherein the first plurality of sensors and the second plurality of sensors comprise a different number of sensors.

17. The lighting fixture of claim 1 wherein the LED light source is configured such that the light for general illumination illuminates an area and the first ILM is exposed to the area when the lighting fixture is installed.

18. The lighting fixture of claim 1 wherein the first ILM further comprises a housing that releasably engages a structural member of the lighting fixture.

19. An intelligent lighting module (ILM) for a lighting fixture that has an LED light source that outputs light for general illumination in response to a drive signal, and a driver module configured to provide the drive signal in response to an ILM instruction, the ILM comprising:
 a plurality of sensors that comprises at least two different types of sensors;
 a first communication interface
 a second communication interface; and
 control circuitry communicatively coupled with the plurality of sensors, the first communication interface, and the second communication interface, and configured to:
  communicate with at least one remote entity via the first communication interface;
  generate the ILM instruction based on sensor data gathered from the plurality of sensors; and
  provide the ILM instruction to the driver module via the second communication interface, wherein the light for general illumination is controlled by the ILM, and communications between the lighting fixture and the at least one remote entity is facilitated by the ILM.

20. The ILM of claim 19 wherein generation of the ILM instruction is further based on information received from the at least one remote entity via the first communication interface.

21. The ILM of claim 20 wherein the information received from the at least one remote entity includes sensor data gathered by at least one sensor associated with the at least one remote entity.

22. The ILM of claim 20 wherein the information received from the at least one remote entity includes an instruction from the at least one remote entity.

23. The ILM of claim 20 wherein the at least one remote entity is another lighting fixture.

24. The ILM of claim 20 wherein the at least one remote entity is a wall controller.

* * * * *